May 10, 1960    S. J. MARKOWSKI    2,935,847
FLOW CONTROL MEANS FOR USE WITH FLAMEHOLDERS AND FLAMESPREADERS
Filed Nov. 18, 1957    2 Sheets-Sheet 1
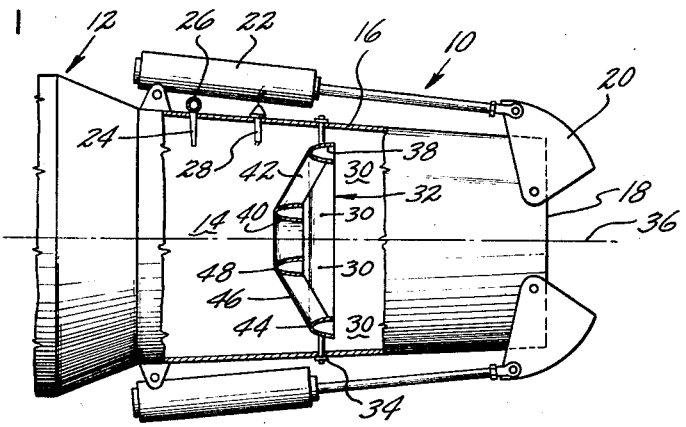
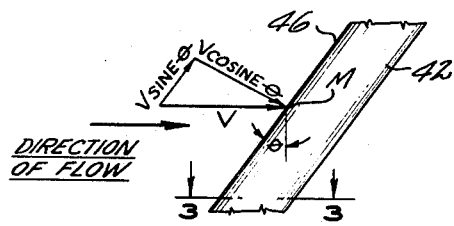
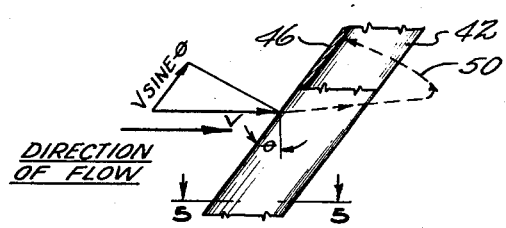
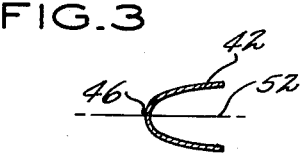
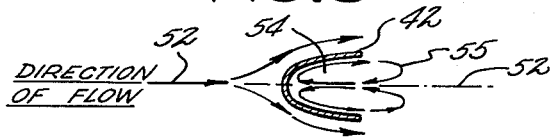
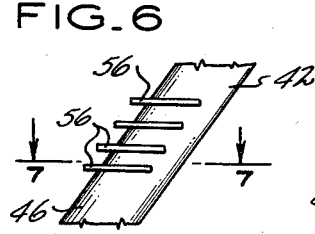
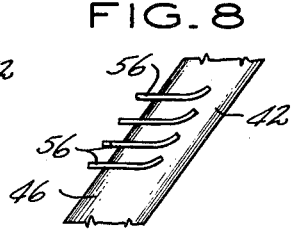
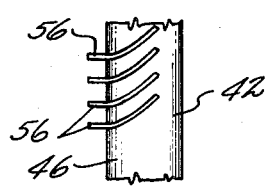
INVENTOR
STANLEY J. MARKOWSKI
BY Vernon F. Hauschild
ATTORNEY

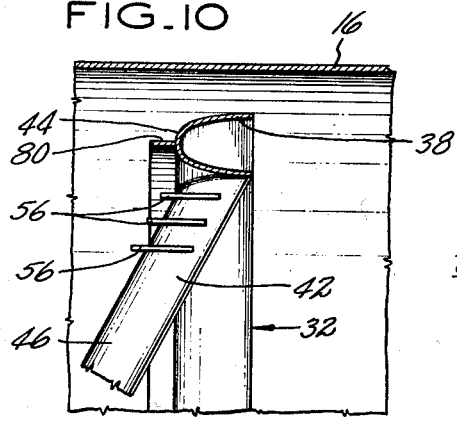
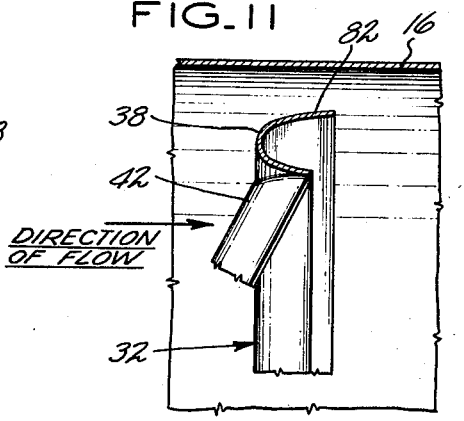
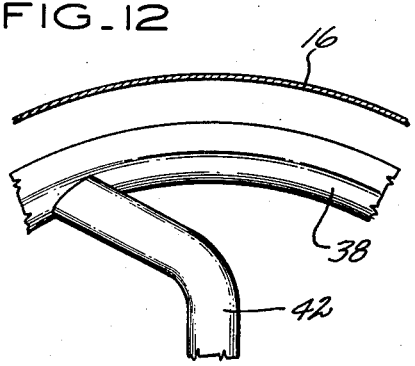
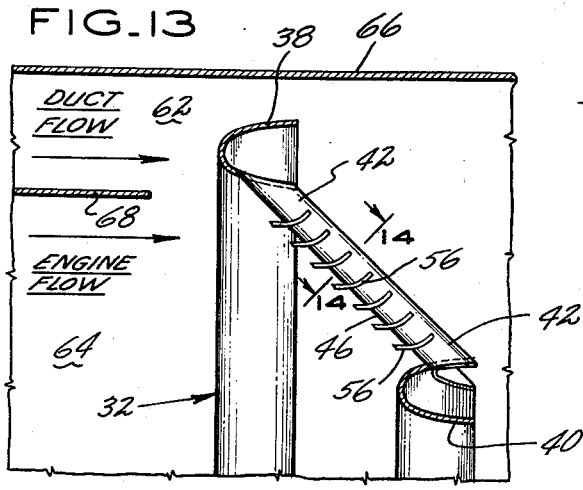
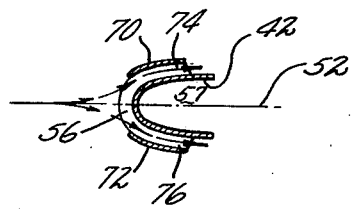

United States Patent Office 2,935,847
Patented May 10, 1960

2,935,847

FLOW CONTROL MEANS FOR USE WITH FLAME-HOLDERS AND FLAMESPREADERS

Stanley J. Markowski, East Hartford, Conn., assignor to United Aircraft Corporation, East Hartford, Conn., a corporation of Delaware Application November 18, 1957, Serial No. 698,887

8 Claims. (Cl. 60—39.72)

This invention relates to supporting combustion in devices such as the afterburners used in modern aircraft turbojet engines and, more particularly, to flameholders and the flamespreaders which are utilized to induce combustion to spread from one flameholder to another.

It is an object of this invention to provide means for controlling the gas flow between flameholders.

It is a further object of the invention to control the flow directional characteristics inherent in an inclined flameholder and to impart flow directional characteristics to a noninclined flameholder.

It is a further object of this invention to provide means to be used with a flamespreader extending between flameholders, which flameholders and flamespreader are fabricated to be of trough-shaped or of U-shaped cross section and opening in a downstream direction, and which means comprises gas flow directing vanes attached to the flameholder exterior and positioned and shaped to either impede or induce internal and/or external gas flow between the flameholders and along the flamespreader.

It is still a further object of this invention to teach a flameholder and flamespreader configuration which will suppress radial secondary flow currents so that fuel-air mixtures do not travel radially beyond their design region and burn in the area of or against adjacent powerplant parts.

It is still a further object of this invention to teach means including flow directing passages which are attachable to the leading edge and/or external surfaces of a trough-shaped flameholder to control the recirculation or reverse flow region downstream of the flameholder by imparting a stronger vectorial component to the gas passing around the flameholder in a direction toward the flamespreader trough center line than would normally be imposed.

Other objects and advantages will be apparent from the following specification and claims and the attached drawings in which:

Fig. 1 is a partial and broken away showing of my flameholder unit invention used in the afterburner of a modern aircraft turbo-jet engine.

Fig. 2 is a fragmentary showing of an inclined flamespreader for the purpose of demonstrating a single exterior flamespreader gas flow vector, induced by gas impact against the flamespreader leading edge.

Fig. 3 is a cross-sectional showing taken along lines 3—3 of Fig. 2.

Fig. 4 is a fragmentary showing of an inclined flamespreader illustrating a possible gas flow path from the flamespreader exterior to the flameholder interior. The gas flow path is determined by many varied factors such as flameholder configuration, flow and combustion operating conditions, and so forth.

Fig. 5 is a cross-sectional showing taken along line 5—5 of Fig. 4 and including gas flow directional arrows to illustrate a possible condition of recirculation downstream of a trough-shaped flamespreader and the reverse gas flow region.

Fig. 6 is a partial showing of an inclined flamespreader utilizing axial flow directing vanes or flow fences.

Fig. 7 is a cross-sectional showing taken along line 7—7 of Fig. 6, to demonstrate a possible vane or flow fence configuration.

Fig. 8 is a fragmentary showing of an inclined flamespreader utilizing curved flow directing vanes to increase the outward flow directional characteristics of the flamespreader.

Fig. 9 is a fragmentary showing of a noninclined flamespreader utilizing curved flow directing vanes to impart outward flow directional characteristics thereto.

Fig. 10 is a fragmentary showing of a flameholder located in a gas passage duct having an inclined flamespreader with a vane, ring or rib attached to the flameholder unit to suppress radial secondary flows of the external gas flow along the flamespreader in the region of the flameholder.

Fig. 11 is a showing of a flameholder in a gas passage duct having an inclined flamespreader and utilizing a rearwardly directed external flameholder lip to suppress radial travel of the secondary gas flow in the flamespreader internal trough to prevent its travel radially beyond the flameholder.

Fig. 12 is a fragmentary showing of a flameholder in a gas passage defining duct with a flamespreader connected thereto such that the interior of the flameholder and flamespreader communicate smoothly and at an angle and, preferably, tangentially.

Fig. 13 is a showing of axially spaced flameholders located in concentric gas passages of the type encountered in ducted fan engines and using an inverted, inclined flamespreader with curved flow directing vanes or fences.

Fig. 14 is a cross-sectional showing taken along line 14—14 of Fig. 13.

Fig. 15 is a cross-sectional showing of a trough-shaped flamespreader utilizing flow directing means in the form of vanes attached to the leading edge thereof, and also utilizing second flow directing means comprising passage forming walls attached to the vane exteriors to form enclosed passages to induce a vectorial motion to the gas passing around the flamespreader thereby increasing the current along the flamespreader axis of the recirculation downstream of the flamespreader.

While my invention will be described in connection with flameholders used in the afterburner of a modern turbojet engine and while it will be particularly directed to flameholders and spreaders of trough-shaped or U-shaped cross section, it should be borne in mind that it is equally applicable to flameholder units of any shape, in any type of gas passage.

As used herein, secondary flow is intended to mean flow along flamespreaders and between flameholders and may occur either within the flamespreader trough or external thereof. Primary flow defines the normal gas flow through the powerplant afterburner.

Secondly gas flow between flameholders and along flamespreaders is affected by many factors, including combustion conditions, primary gas flow conditions caused by engine operation, boundary layer effects, proximity of associated parts, and other causes. The direction, intensity, and pattern of secondary gas flow can be predicted analytically and determined by appropriate instrumentation during afterburner operation and the teachings of this invention may then be utilized to control the secondary flow by augmenting or suppressing the secondary flow in its existing flow direction or changing secondary flow direction by inducing secondary flow vectors by the use of flow fences to accomplish the desired result.

Referring to Fig. 1, we see afterburner 10 attached to modern aircraft turbojet engine 12 of the type described in United States Patent Nos. 2,711,631 and 2,770,946. Gases are passed from engine 12 through gas passage 14 defined by afterburner duct 16 and are eventually discharged to atmosphere, after the afterburning now to be described, through exhaust outlet 18 which may be equipped with exhaust nozzle 20 and exhaust nozzle actuating means 22. Exhaust nozzle actuating means 20 may be a hydraulic cylinder-piston unit. Fuel is injected into gas passage 14 of afterburner 10 through fuel spray bars 24 which may be positioned circumferentially about afterburner duct 16 and which will be provided fuel by fuel manifold 26 to which it is pumped by a pump (not shown). The fuel injected through fuel bars 24 mixes with primary flow gas passing through gas passage 14 to form a combustible mixture therewith and is ignited by any convenient ignition means, such as spark plug 28, and is burned in afterburner 10 in combustion region 30 downstream of flameholder unit 32 in the relatively stagnant zone formed by flameholder unit 32. If flameholder unit 32 were not located in gas passage 14 by attachment through any convenient attachment means such as nut and bolt arrangement 34 to afterburner 16, the ignited charge would be discharged to atmosphere through exhaust outlet 18 immediately due to the high velocity primary gas flow through afterburner 10. Flameholder unit 32 performs a function of establishing combustion zones 30 which are flow stagnation or reverse flow areas which permit combustion to be supported within duct 16 of afterburner 10. Afterburner duct 16 is preferably of circular cross section and has longitudinal axis 36 which is co-axial with the longitudinal axis of engine 12.

It will be noted in Fig. 1 that flameholder unit 32 is made up of a large flameholder ring 38 and a smaller flameholder ring 40, each of which is concentric about longitudinal axis 36, and at least one flamespreader 42 which passes between flameholders 38 and 40 and which is in aerodynamic communication with each. Flameholders 38 and 40 and flamespreader 42 are trough-shaped; that is, they are of substantially U-shaped cross section with the trough or U opening in a downstream direction and with the smooth leading edge exterior surfaces 44, 46, 48 of flameholder 38, flamespreader 42 and flameholder 40 respectively, located along the upstream surface of flameholder unit 32 and presenting smooth aerodynamic flow surfaces.

The flameholder unit 32 depicted in Fig. 1 shows the flameholders 38 and 40 to be axially spaced from one another and to be joined by an inclined flamespreader 42. It should be borne in mind that the relative axial positions of flameholders 38 and 40 could be reversed as illustrated in Fig. 13 or that they could each lie in a common plane perpendicular to axis 36, in which case flamespreader 42 would be radially directed as illustrated in Fig. 9. Further, any number of flameholders could be used and the flameholder unit could be of any convenient shape or configuration.

Flamespreaders such as 42 perform the function of inducing combustion to occur in the combustion zones set up by each flameholder by providing an aerodynamic communication and inducing secondary flow between the various flameholders. The flamespreaders may be of any desired number and extend in any desired direction, but when used between trough-shaped flameholder rings, the flamespreaders normally extend radially and permit the passage of a combustible mixture, ignited or otherwise, to pass from a superior performing flameholder to another flameholder which may be located in a difficult combustion zone. For instance, flamespreaders are of advantage in directing flame or combustible mixtures from a flameholder located in a zone which has good ignition and combustion supporting qualities to a zone which is difficult to ignite and which has poor combustion supporting qualities. Further, flamespreaders are advantageous in situations where pilot ignition is used to ignite the combustible mixture adjacent a particular flameholder, in which case the flamespreader spreads the flame to other flameholders. By pilot ignition, we mean a pilot flame which may be ignited for ignition purposes only.

In view of the flamespreading function performed by flamespreader 42, the secondary gas flow and combustible fuel mixture flow along both the exterior and interior of flamespreader 42 is of material importance. In certain installations, it may be desirable to provide means to control this secondary gas flow by either augmenting or impeding same, depending upon the problem involved. In certain flameholder installations, it may be important to provide substantial quantities of gas flow between one flameholder and another, possibly because we are directing the combustible mixture to a flameholder located in an area where ignition is difficult or because we are passing this mixture in a substantially radial direction, as will be discussed later in connection with Fig. 9. Under these circumstances, we may wish to augment the secondary flow along flamespreader 42, either the internal flow or the external flow, or both. Under other circumstances, we might wish to impede the secondary flow, either internal or external, along the flamespreader 42 for the purpose of possibly favoring flow to an associated flamespreader or to prevent combustible mixture "spill-over" radially outboard of an external flameholder. By the term "spill-over," we mean that a greater quantity of combustible mixture is provided through a flamespreader 42 to the flameholder region with which it communicates than this particular flameholder region is capable of receiving for combustion. Under these circumstances, the excess quantity of combustible mixture, due to its radial momentum, overflows or "spills-over" the flameholder and will continue radially outboard where it comes into contact with the inner surface of afterburner duct 16 and is burned as it is directed downstream by the primary gas flow forming damaging hot streaks along the afterburner duct downstream of such a flamespreader-flameholder connection. "Spill-over" is undesirable because of the damage which it causes to such parts as the afterburner duct and even the flaps of exhaust nozzle 20 since it causes combustion to occur in close proximity to or against these parts.

It is a main purpose of this invention to provide means to control or divert the gas flow passing around flameholder 40 to either induce or impede internal and/or external gas flow between the flameholders, particularly along the flamespreaders.

It is a feature of an inclined flamespreader of the type shown in Fig. 1, that it have good directional characteristics; that is, that it have positive secondary flow along the exterior and the interior of the flamespreader. A possible inclined flamespreader secondary flow pattern is illustrated in Figs. 2 through 5 in which primary air contacts flamespreader 42, which is symmetric about centerline 52, at leading edge 46 at velocity V, to cause a potential vector triangle (Fig. 2) to create a possible secondary flow interior path 50 and reverse flow or recirculation pattern 55 in low pressure area 54.

One of the main purposes of this invention is to provide gas flow directing, controlling or diverting means to either impede or induce the secondary gas flow along the interior or exterior of flamespreader 42. These flow directing means may consist of one or more vanes or flow fences 56, illustrated in Figs. 6 through 9, which are preferably attached to the forward or upstream side 46 of flamespreader 42 to be joined to a substantial portion of the trough exterior.

Fig. 6 illustrates straight vanes which are intended to control the gas flow along inclined flamespreader 42 by impeding secondary flow. Vanes 56 will be spaced along the upstream edge 46 of flamespreader 42 as needed, and will extend along the trough exterior toward trailing edges 58 and 60 of the flamespreader 42 a predetermined distance, possibly as shown in Fig. 7.

Whereas the configuration shown in Fig. 6 is intended to impede secondary gas flow along inclined flamespreader 42, the configuration shown in Fig. 8 is intended to induce secondary gas flow along inclined flamespreader 42 due to the shape of flow fences or vanes 56.

Fig. 9 illustrates a radially extending flamespreader 42 which would be used to connect flameholders lying in a common radial plane, which plane is perpendicular to the axis 36 of afterburner duct 16 (Fig. 1). It will be noted that vanes 56 are shaped as in Fig. 8 to induce both interior and exterior flamespreader flow. In this fashion, we are imparting a directional flow characteristic to a radial flameholder which by its nature does not have such a characteristic.

A particularly difficult flamespreader flow augmenting problem is illustrated in Fig. 13 in which flameholder unit 32 is positioned within concentric gas passages 62 and 64 defined by ducts 66 and 68. In this installation, flameholder 38 is placed in gas passage 62 which may be the cold air fan passage from a ducted fan engine while flameholder 40 is positioned in hot gas passage 64 which may be the engine gas passage of a duct fan engine. It will be noted that flameholders 38 and 40 are axially displaced in the reverse direction from those illustrated in Fig. 1 so that flamespreader 42 is inverted and inclined and, therefore, a difficult interflameholder gas flow problem from flameholder 40 to flameholder 38 is presented. The plurality of curved vanes 56, which may be of substantial size as illustrated in Fig. 14, are placed along the forward edge 46 of inverted or reversely inclined flamespreader 42 to impart a flamespread vector to the gas passing therebetween which must be sufficient to induce secondary gas flow along flamespreader 42 toward flameholder 38. It might be found advantageous to supplement the flow turning vanes 56 with passage forming strips 70 and 72 which are attached to the vane exteriors as shown in Fig. 15 and which form confining gas passages 74 and 76 serving to direct the gas passing between vanes 56 to flow in close contact with the surfaces of flamespreader 42, thereby frequently imparting a gas flow vector thereto in a direction toward flame spreader cross-sectional axis or center line 52, thereby controlling and augmenting the recirculation or reverse flow zone 56 downstream and in the interior of flameholder 42. Obviously, plates 70 and 72 and vanes 56 could be shaped so as to divert the gas flow away from the sides of flamespreader 42 to weaken or impede recirculation and reverse flow in area 57. Also, plates 70 and 72 may be used with any vanes or flow fences.

As mentioned previously, one of the problems associated with flamespreader gas flow is "spill-over" and, as described supra, "spill-over" causes combustion to occur and thereby causes hot streaks along the interior of gas passage defining ducts such as 16. Fig. 10 illustrates a method of preventing "spill-over" of external flame spreader flow and includes providing uncurved flow blocking vanes 56 along the forward edge 46 of flamespreader 42 and also providing dam, ring or lip 80 projecting upstream or forward from the leading edge 44 of flameholder 38. These devices will block exterior flameholder secondary gas flow such that it does not proceed radially beyond flameholder 38 and thereby come in contact with duct 16. Fig. 11 provides a method for combating "spill-over" due to internal flamespreader secondary flow and comprises providing a rearwardly directed lip extension 82 on the exterior surface of flameholder 38 to serve to block radial gas flow beyond flameholder 38 and to impart an axial component to said gas flow. Fig. 12 illustrates another method of preventing "spill-over" and comprises shaping flamespreader 42 such that the trough interior thereof comes into aerodynamic connection with the trough interior of flameholder 38 at a smooth angle, preferably tangentially, thereby eliminating the radial vector of secondary gas flow.

While particular embodiments have been shown to illustrate my invention, it will be obvious to those skilled in the art that various combinations of these embodiments can be used together to provide a desired result.

I claim:

1. A gas passage having an axis, a flameholder unit located in said gas passage and comprising a first flameholder, a second flameholder located in part nearer said axis than said first flameholder, a flame spreader strut extending between and attached to said flameholders, gas flow directing vanes attached to said flame spreader strut and shaped to control gas flow along said flame spreader strut.

2. A flame holder unit adapted to be located in a gas passage and comprising a large flameholder ring, a smaller flameholder ring, a flame spreader strut extending substantially radially between said flameholders and attached thereto, gas flow directing vanes attached to said flame spreader and shaped to control substantially radially directed gas flow along said flamespreader.

3. A duct of circular cross section having a longitudinal axis and defining a gas passage, a flame holder unit attached to said duct and positioned in said gas passage comprising a first flameholder fabricated as a rearwardly opening large diameter ring of trough shaped cross section, a second flameholder fabricated as a rearwardly opening ring of smaller diameter than said first flameholder and of trough shaped cross section, a substantially radially extending flame spreader strut fabricated in cross section as a rearwardly opening trough and extending between said flameholders and attached thereto such that the trough interiors of said flameholders and said flame spreader are joined, gas flow directing vanes attached to the forward exterior of said flame spreader and shaped to control the substantially radially directed gas flow therealong.

4. A duct defining a gas passage and having a longitudinal axis, means to pass gas through said duct, a flameholder unit located in said gas passage and comprising a first flameholder, a second flameholder closer to said axis than said first flameholder, and spaced axially therefrom, a flame spreader of trough shaped cross section extending between said flameholders and opening in a downstream direction, and gas flow directing vanes attached to the flame spreader trough exterior and shaped to induce axial gas flow around said flame spreader.

5. A duct defining a gas passage and having a longitudinal axis, means to pass gas through said duct, a flameholder unit located in said gas passage and comprising a first flameholder lying in a plane perpendicular to said axis, a second flameholder closer to said axis than said first flameholder and lying in the same plane as said first flameholder, a radially extending flame spreader of trough shaped cross section extending between said flameholders and opening in a downstream direction, and gas flow directing vanes attached to the flame spreader trough exterior and shaped to induce radial gas flow along said flameholder.

6. A duct defining a gas passage and having a longitudinal axis, means to pass gas through said duct, a flameholder unit located in said gas passage and comprising a first flameholder, a second flameholder closer to said axis than said first flameholder, a flame spreader of trough shaped cross section extending between said flameholder and opening in a downstream direction, and gas flow directing means including vanes attached to the flameholder unit exterior and positioned and shaped to impede radial gas flow radially beyond said flameholders.

7. A duct defining a gas passage and having a longitudinal axis, means to pass gas through said duct, a flameholder unit located in said gas passage and comprising a first flameholder, a second flameholder closer to said axis than said first flameholder, a flame spreader of trough shaped cross section extending between said flameholders and having a cross-sectional axis and opening in a downstream direction, first gas flow directing means attached to the flame spreader exterior and shaped to control gas flow along said flame holder, and second flow directing means attached to said first flow directing means and shaped to impart a component in a direction toward said flame spreader cross-sectional axis to the gas flow thru said first gas flow directing means.

8. A duct defining a gas passage and having a longitudinal axis, means to pass gas through said duct, a flameholder unit located in said gas passage and comprising a first flameholder, a second flameholder closer to said axis than said first flameholder and spaced axially therefrom, a flame spreader extending between said flameholders, and gas flow directing vanes attached to the flame spreader and shaped to control gas flow along said flame spreader.

References Cited in the file of this patent

UNITED STATES PATENTS

| | | |
|---|---|---|
| 2,714,287 | Carr | Aug. 2, 1955 |
| 2,720,754 | Francois | Oct. 18, 1955 |
| 2,799,991 | Conrad | July 23, 1957 |
| 2,835,109 | Longwell | May 20, 1958 |
| 2,872,785 | Barrett et al. | Feb. 10, 1959 |